W. H. JAKWAY.

VACUUM CLEANING APPARATUS.

APPLICATION FILED DEC. 5, 1910.

Reissued Jan. 9, 1917. 14,246.

WITNESSES:

Chas. H. Young

Y. B. Smith

INVENTOR

William H. Jakway

BY

Parsons & Bidell

ATTORNEYS

THE NORRIS PETERS CO., PHOTO-LITHO., WASHINGTON, D. C.

UNITED STATES PATENT OFFICE.

WILLIAM H. JAKWAY, OF SYRACUSE, NEW YORK.

VACUUM CLEANING APPARATUS.

14,246. Specification of Reissued Letters Patent. Reissued Jan. 9, 1917.

Original No. 970,232, dated September 13, 1910, Serial No. 520,528, filed October 1, 1909. Application for reissue filed December 5, 1910. Serial No. 595,839.

*To all whom it may concern:*

Be it known that I, WILLIAM H. JAKWAY, of Syracuse, in the county of Onondaga and State of New York, have invented a certain new and useful Vacuum Cleaning Apparatus, of which the following is a specification.

This invention relates to apparatus which is particularly designed for cleaning carpets, rugs and other floor-coverings, and it has reference to the class of apparatus comprising a suction-nozzle which is designed to be drawn firmly over the article to be cleaned and is attached to a flexible air-tube communicating with suitable devices operative for producing a vacuum, whereby the inrush of air through the tube and resultant suction at the nozzle causes the dirt and dust etc. to be drawn through the tube to a suitable receiver.

The present invention resides in a cleaning-apparatus embodying essentially an air-passage, means for conducting a stream of water under pressure into communication with the passage to produce a partial vacuum therein, and a flexible air-tube connected at one end to the passage and provided at its opposite end with a nozzle, whereby the suction created at the nozzle incident to the in-rush of air through the tube, causes the particles of dirt, etc., to be withdrawn from the carpet or other article and carried with the air through the tube to the passage, whereupon the particles are caught in the stream of water and discharged therewith into suitable means for receiving waste-water.

The main object of this invention is to produce a simple and reliable apparatus wherein a very rapid and continuous exhaustion will be effected for the purpose stated, and at the same time provide a construction which will positively guard against spattering of the dirt-laden water incident to its discharge.

Other objects of the invention will be apparent from the novel arrangement and combination of the component parts of the apparatus hereinafter fully described and set forth in the claims.

Figure 1:
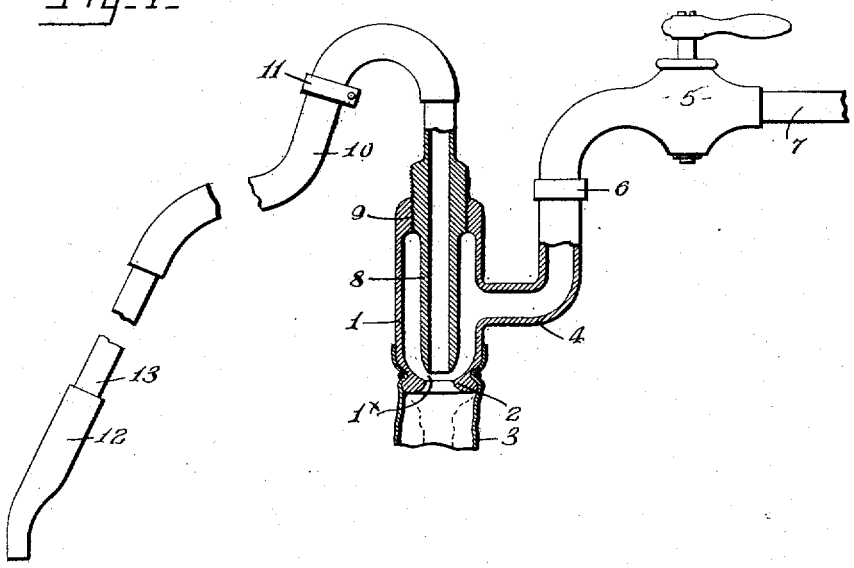
Figure 2:
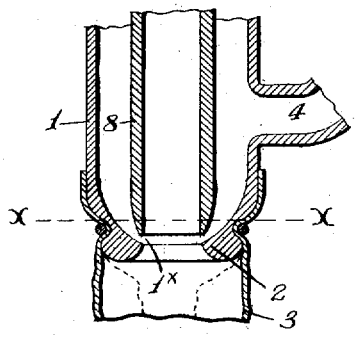
Figure 3:
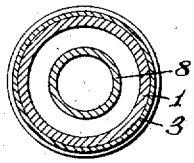

In the accompanying drawings Figure 1 is a longitudinal sectional view of the apparatus embodying my invention. Fig. 2 is an enlarged detail sectional view of a portion of the water-chamber and the tube which conducts the dirt-laden air therethrough to the water discharge. Fig. 3 is a transverse section on the line X—X in Fig. 2.

This chamber consists of a rigid shell 1 having its lower end portion contracted to provide a throat 2 preferably of circular form and constituting the outlet. Extending downwardly from the throat is a vertically arranged collapsible discharge tube 3 which may be secured to said throat portion by any well known clamping means.

To one side of the water-chamber is suitably connected an upwardly extending feed tube 4 which may be connected at its upper end to any pipe for supplying water under pressure. In the present instance the tube 4 is shown attached to a well known faucet 5 by means of a suitable coupling 6, said faucet being connected to a service-pipe 7.

The upper end of the chamber 1 is provided with an opening in which is secured a metal air-conducting tube 8 which extends vertically and centrally through the chamber and has its lower end disposed adjacent to and concentric with the throat 2 of the chamber so as to provide a ring-shaped orifice $1^{\times}$, surrounding the end of the air-tube. The external diameter of this air-tube slightly exceeds the diameter of the throat, whereby the water directed through the throat into the discharge-tube assumes the form of an inverted cone. The said tube 8 is supported vertically adjustable in any convenient manner but preferably by screw-threading the parts as indicated at 9, the purpose of which adjustment is to regulate the area of the orifice $1^{\times}$. The upper end portion of this tube is curved downward and is provided with a suitable coupling 11 for the connection of one end of a flexible tube 10 consisting of the well known rubber-hose, to the opposite end of which hose is attached a suction-nozzle 12 which may be of any suitable or well known form and is designed to be drawn firmly over the article to be cleaned. To conveniently manipulate the said suction-nozzle, I provide the same with a tubular handle 13 to the upper end of which the said hose 10 is suitably attached. For convenience the hose may be applied over the upper end of the handle with tight fit.

One function of the tube 3 is to protect the inverted water-cone from being disrupted by the passage of the air through the wall of the cone in order to create a partial vacuum at the lower end of the tube 8 so as to effectually maintain a constant exhaustion of air from the latter tube.

It has been discovered by experience that a rigid metal discharge-tube will not produce the desired result, the fact being that should the atmospheric pressure exceed the pressure of the air within the tube 8, the outside air would rush up the said tube and thereby disrupt the water-cone and thus destroy the vacuum, whereby there would be no exhaustion of air from tube 8. I therefore use a flexible discharge-tube 3 which is composed of thin rubber, whereby it is rendered collapsible. The adaptability of this flexible tube to collapse to a greater or less degree causes this tube to act as an automatic regulator in that it compensates for any differences between the pressure of the air in the tube 8 and the atmospheric pressure, the outside air contracting the flexible tube more or less when the pressure of this air exceeds to a greater or less degree the pressure of the air within, whereby the cone of water is unimpared.

The variation of the pressure of the air in the tube 8 results from the closing of the opening of the suction-nozzle 12 to a greater or less degree incident to drawing the said nozzle over the carpet or other article being cleaned.

In order that my invention may be more fully understood, I will now describe the operation of the apparatus provided with the flexible discharge-tube.

When the water under pressure is turned into the tube 4 it is conducted into the chamber 1, from which chamber it escapes through the ring-shaped orifice 1× into the said flexible discharge-tube 3. The shape and arrangement of the said orifice causing the water to be directed into the tube 3 in the form of an inverted cone, as before stated, maintains a partial vacuum at the lower end of the tube 8 and thus produces a very rapid and constant exhaustion of the air from the said tube, whereby a continuous in-rush of air is produced in the tube and the hose 10 connected thereto.

By drawing the nozzle firmly over the carpet or other article during the passage of the water through the chamber 1 and tube 3, the suction produced at the nozzle will obviously cause the particles of dirt, etc., to be withdrawn from the carpet and carried through the hose and tube 8 with the air which naturally rushes through the hose and tube with a tendency to fill the vacuum created, whereupon the dirt-laden air entrapped in the tube 8 is caught by the inverted cone of water surrounding the lower end of said tube, and thus the dirt or dust is discharged with the water through the tube 3.

What I claim is:

1. An apparatus for the purpose specified comprising an upright rigid chamber formed at its lower end with a contracted throat constituting the outlet thereof, and provided in its upper end with an opening, an air-conducting tube secured in said opening and arranged centrally and vertically within the chamber and concentric with the outlet-opening, the lower end of said tube terminating slightly above the outlet-opening and having its external diameter exceeding the diameter of the opening, to provide a ring-shaped orifice around the lower end of the air-tube, means for conducting water under pressure to the chamber, and a flexible discharge-tube attached to the outlet of the chamber and disposed in line with the air-tube, whereby the orifice is caused to direct the water from the chamber into the discharge-tube in the form of an inverted cone surrounding the adjacent end of the air-tube, said discharge-tube being entirely free below its attachment and independent of the air-tube whereby it is adapted to collapse to a greater or less degree to compensate for the difference in the atmospheric pressure and the pressure within the said air-tube as and for the purpose set forth.

2. In an apparatus for the purpose specified, the combination of means for conducting water under pressure and including an upright rigid chamber having a contracted outlet-opening in its lower end, an air-tube arranged centrally and vertically within the chamber and concentric with the outlet opening, the lower end of said tube terminating slightly above the outlet-opening and having its external diameter exceeding the diameter of said opening so as to produce a ring-shaped orifice around the air-tube for the passage of the water through the outlet, a flexible discharge tube connected to the outlet of the chamber and suspended therefrom, whereby the water is directed through the said orifice into the said discharge-tube in the form of an inverted cone surrounding the adjacent end of the air-tube, thus maintaining a partial vacuum at the lower end of the central tube so as to cause rapid and continuous exhaustion of air, said discharge-tube being entirely free below its attachment whereby it is adapted to collapse to a greater or less degree to compensate for the difference between the atmospheric pressure and the pressure within the air-tube so as to guard against disruption of the water-cone and the resultant destruction of the vacuum, substantially as and for the purpose specified.

3. In an apparatus for the purpose specified, the combination of an air-conducting tube, hydraulic means including a chamber surrounding the tube and provided in its lower end with an outlet-opening disposed slightly below the tube and concentric therewith and having a smaller diameter than the external diameter of the tube, and a flexible discharge-tube attached to the chamber at the opening and arranged axially in line with the air-conducting tube, whereby the water is directed into the discharge-tube in the form of an inverted cone surrounding the adjacent end of the air-conducting tube so as to create a partial vacuum at the lower end of said air-tube and thus produce a rapid and constant exhaustion of air therefrom, said air-conducting tube being adjustable in relation to the outlet-opening, and the said discharge-tube being entirely free below the air-conducting tube and water directing means whereby it is adapted to collapse under variations in the pressure of air so as to guard against an in-rush of the external air through the discharge-tube and thus prevent disruption of the cone of water, substantially as and for the purpose described.

4. In an apparatus for the purpose specified the combination of a suction tube, and a chamber inclosing a portion of the tube and having an outlet located near one end of the tube and of less diameter than the same, the internal wall of said chamber adjacent said outlet extending at an angle approaching a right angle to the axis of the outlet, whereby fluid entering the chmber is projected by said internal wall near the outlet of the tube across said outlet in the form of a hollow flattened cone, substantially as and for the purpose described.

5. The combination with a suction tube, and a chamber inclosing a portion of the tube and having an outlet located in close juxtaposition to one end thereof and of less diameter than the same and an inlet for water under pressure, the internal wall of said chamber adjacent said outlet being disposed at an obtuse angle to the plane of the upper edge of said outlet whereby a fluid discharged through the latter will form a hollow inverted cone in advance of the end of the suction tube and with the latter substantially coincident with the base of the cone, of an automatic regulator for compensating for variation in pressure occurring in the suction tube, substantially as and for the purpose specified.

6. The combination with a suction tube and a chamber associated with one end portion of said suction tube and having an inlet for a fluid under pressure and an outlet in advance of the end of said tube and disposed relatively to said tube so that the fluid passing through said outlet will form a cone, of means for automatically compensating for variation in the atmospheric air pressure on opposite sides of the wall of said cone whereby rupture of the latter is prevented, substantially as and for the purpose set forth.

7. The combination with a suction tube and a chamber associated with one end portion of said suction tube, and having an inlet for water under pressure, and an outlet disposed relatively to said tube and in advance of the end thereof, so that a fluid passing through said outlet will form an inverted cone, of means for automatically compensating for variation in air pressure on opposite sides of the wall of said cone whereby rupture of the latter is prevented, said means comprising a tube depending from the chamber and provided with a flexible portion, substantially as and for the purpose described.

8. In an apparatus for the purpose specified, the combination with a chamber having an outlet, a conduit in communication with the chamber for supplying a fluid under pressure thereto and a suction tube having one end located in the chamber and in close juxtaposition to the outlet thereof, so that the fluid discharged through said outlet takes the form of an inverted cone having a thin wall, and an automatic regulator located externally of the chamber and operable by a variation occurring in the pressure on opposite sides of said cone, substantially as and for the purpose set forth.

9. In an apparatus for the purpose specified, the combination with a chamber designed to have a fluid under pressure supplied thereto and provided with an outlet, and a suction tube terminating back of said outlet, the chamber and tube being so constructed that an inverted cone having a thin wall is provided at the end of the suction tube by the fluid discharged through the outlet, and an automatic regulator for preserving said cone from rupture, said regulator comprising a tube surrounding the outlet and provided with a flexible portion, substantially as and for the purpose described.

10. In an apparatus for the purpose specified, the combination with a chamber designed to have a fluid under pressure supplied thereto and provided with an outlet, and a suction tube terminating back of said outlet, the chamber and tube being so constructed that an inverted cone is provided at the end of the suction tube by the fluid discharged through the outlet, and an automatic regulator for preserving said cone from rupture, said regulator comprising a flexible tube secured at one end to the chamber about said opening, substantially as and for the purpose set forth.

11. In an apparatus for the purpose specified, the combination with a chamber designed to have a fluid under pressure supplied thereto and provided with an outlet, and a suction tube terminating back of said outlet, the chamber and tube being so constructed that an inverted cone is provided at the end of the suction tube by the fluid discharged through the outlet in the chamber, and an automatic regulator for preserving said cone from rupture, said regulator comprising a tube of flexible material, said tube being of greater diameter than the said outlet and secured at one end to said chamber about said outlet, and depending therefrom, substantially as and for the purpose described.

In testimony whereof, I have hereunto signed my name in the presence of two attesting witnesses, at Syracuse, in the county of Onondaga, in the State of New York, this 1st day of December, 1910.

WILLIAM H. JAKWAY.

Witnesses:

L. M. Davis,

S. Davis.

Copies of this patent may be obtained for five cents each, by addressing the "Commissioner of Patents, Washington, D. C."